United States Patent
Widmann et al.

(10) Patent No.: US 7,501,938 B2
(45) Date of Patent: Mar. 10, 2009

(54) VEHICLE RANGE-BASED LANE CHANGE ASSIST SYSTEM AND METHOD

(75) Inventors: Glenn R Widmann, West Bloomfield, MI (US); Gregory K. Scharenbroch, Kokomo, IN (US); Joseph E. Harter, Jr., Kokomo, IN (US); Matthew R. Smith, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 256 days.

(21) Appl. No.: 11/135,176

(22) Filed: May 23, 2005

(65) Prior Publication Data

US 2006/0261936 A1 Nov. 23, 2006

(51) Int. Cl.
*B60Q 1/00* (2006.01)

(52) U.S. Cl. .................. 340/435; 340/903; 180/167; 180/169

(58) Field of Classification Search .......... 340/903, 340/904, 555, 557, 435; 180/167, 169; 367/107, 367/907, 99
See application file for complete search history.

(56) References Cited

U.S. PATENT DOCUMENTS

| | | | | |
|---|---|---|---|---|
| 4,943,796 A | * | 7/1990 | Lee | 340/435 |
| 5,424,952 A | * | 6/1995 | Asayama | 701/200 |
| 5,631,639 A | * | 5/1997 | Hibino et al. | 340/903 |
| 5,668,539 A | | 9/1997 | Patchell | 340/903 |
| 5,668,675 A | * | 9/1997 | Fredricks | 359/843 |
| 5,786,772 A | * | 7/1998 | Schofield et al. | 340/903 |
| 6,470,273 B2 | | 10/2002 | Halsted et al. | 701/301 |
| 6,753,766 B2 | | 6/2004 | Patchell | 340/436 |
| 2004/0196146 A1 | | 10/2004 | Harter, Jr. et al. | 340/435 |

FOREIGN PATENT DOCUMENTS

| | | |
|---|---|---|
| DE | 19725656 | 1/1998 |
| EP | 0443185 | 8/1991 |
| EP | 1607264 | 12/2005 |

OTHER PUBLICATIONS

EP Search Report Dated Sep. 15, 2006.
English Translation of EP 0 443 185 A.
English Translation of the Abstract of DE 197 25 656 A1.
English Translation of the Abstract of EP 1 607 264 A1.

* cited by examiner

*Primary Examiner*—Anh V La
(74) *Attorney, Agent, or Firm*—Douglas D. Fekete

(57) ABSTRACT

A lane change assist system and method are provided for assisting the driver of the vehicle in maneuvering a lane change. The system includes a range sensor mounted on a vehicle for sensing range to an object in a side detection zone adjacent to one side of the vehicle. The system also includes a controller for determining when the side detection zone is clear for the vehicle to change lanes based on the sensed range signal. The controller determines whether there is sufficient space to initial a lane change maneuver based on the sensed range signal and generates an output signal indicative thereof. An output is provided to warning lights indicative of the determined state for initiating the lane change maneuver.

22 Claims, 4 Drawing Sheets

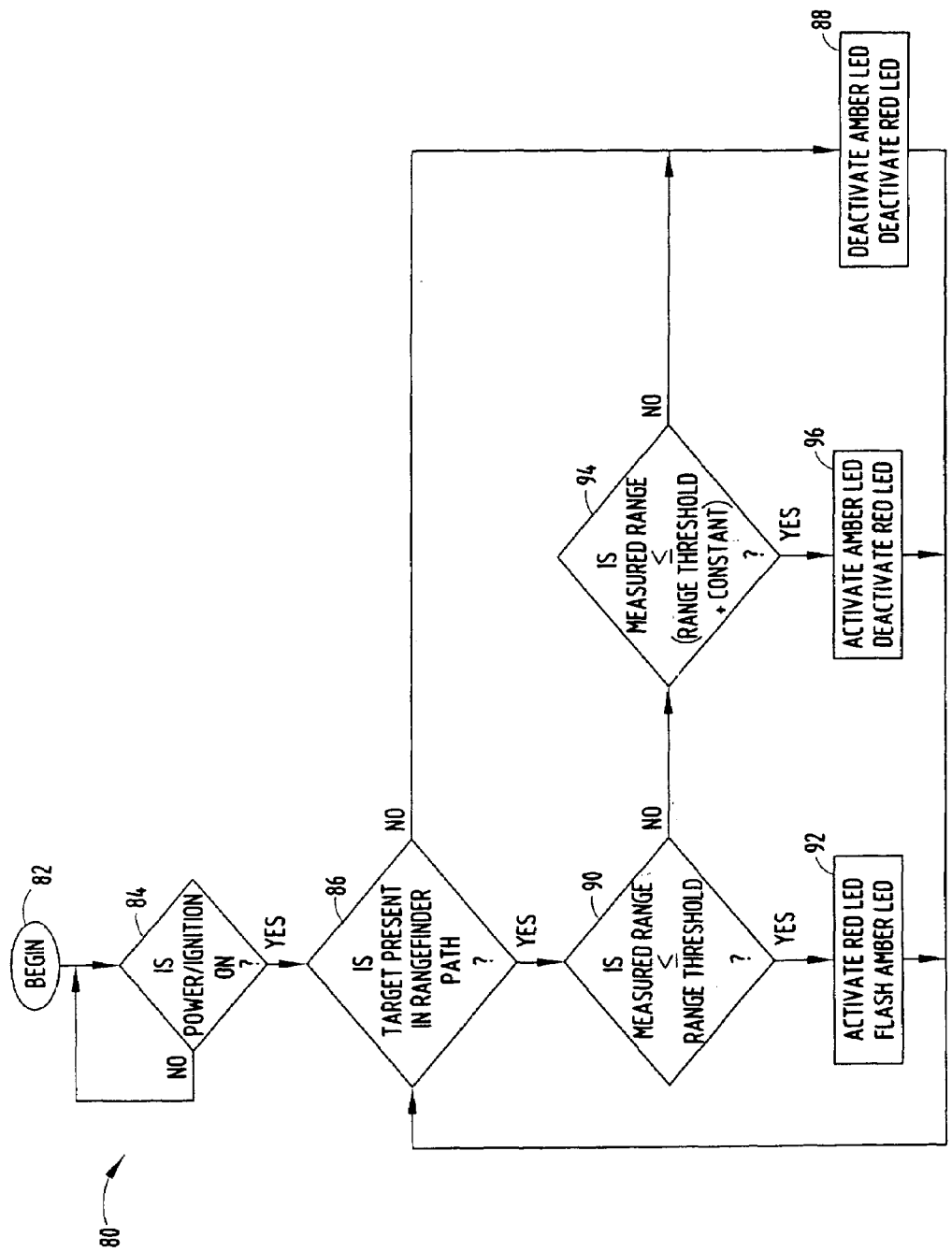

VEHICLE RANGE-BASED LANE CHANGE ASSIST SYSTEM AND METHOD

TECHNICAL FIELD

The present invention generally relates to object detection and, more particularly, to detecting objects in a lane adjacent to a vehicle and assisting the driver of the vehicle to maneuver a lane change.

BACKGROUND OF THE INVENTION

Automotive vehicles are increasingly being equipped with collision warning systems that warn the driver of the host vehicle of objects (e.g., other vehicles) that may pose a potential obstruction to the host vehicle. Vehicles are typically also equipped with exterior mounted side view mirrors for viewing a portion of the side of the host vehicle. It should be appreciated that many vehicles exhibit unviewable areas in the mirrors which are commonly referred to as a blind spot regions.

Drivers of longer vehicles, such as heavy duty commercial trucks and light duty trucks towing a trailer, can have difficulty judging when the destination lane is sufficiently clear to perform a lane change maneuver. Given the large distance between the driver seat and the rear end of longer vehicles, it can be quite difficult to view and judge the distance via the side view mirrors to the rear of the truck and the distance to objects in the adjacent lane. Thus, it may become difficult for the driver of such vehicles to ascertain the presence of an obstacle in the lane to which the vehicle is maneuvering.

A number of detection systems have been proposed for detecting the presence of object(s) in a vehicle blind spot region and alerting the driver of the detected object(s). One example of a detection system for detecting objects emitting thermal radiation in a blind spot of a vehicle is disclosed in U.S. patent application No. 10/407,507, filed Apr. 5, 2003, and entitled "OBJECT DETECTION FOR A STOPPED VEHICLE," now issued as U.S. Pat. No. 6,961,006, the entire disclosure of which is hereby incorporated herein by reference. Another example of a proposed detection system for detecting object(s) in a blind spot of a vehicle is disclosed in U.S. Pat. No. 5,668,539, which is also hereby incorporated herein by reference. The aforementioned detection approaches employ infrared sensors, such as thermopile sensors, to detect thermal emitting objects in a blind spot region of the host vehicle.

Another proposed technique for detecting object(s) in the vehicle blind spot region of the adjacent lane employs video imaging cameras mounted on the host vehicle to capture video images of the adjacent lane next to the host vehicle. The captured video images are then displayed on an onboard display monitor in the vehicle. Such conventional camera-based detection systems are generally expensive and suffer a number of drawbacks. Additionally, conventional blind spot detection systems generally focus on the blind spot region and do not provide other information on detected objects, particularly those outside the blind spot region.

It is therefore desirable to provide for a cost-effective and easy to employ system for assisting the driver of a vehicle to easily and unobstructively maneuver a lane change. In particular, it is desirable to provide for a lane change assist system and method that enables the driver of a long vehicle, such as a commercial vehicle having a trailer, to maneuver the vehicle into adjacent lanes. It is further desirable to provide for such a system that is easy for a consumer to install and use.

SUMMARY OF THE INVENTION

In accordance with the teachings of the present invention, a lane change assist system and method are provided for assisting the driver of the vehicle in maneuvering a lane change. The system includes a range sensor mounted on a vehicle for sensing range to an object in a side detection zone adjacent to one side of the vehicle. The system also includes a controller for determining when the side detection zone is clear for the vehicle to change lanes based on the sensed range signal. The controller determines whether the adjacent lane is sufficiently clear to initiate a lane change maneuver based on the sensed range signal, and generates an output signal indicative thereof. An output is provided for outputting the output signal indicative of the determined state for initiating the lane change maneuver.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 5 is a flow diagram illustrating a routine for executing the lane change assist processing of the present invention.

DESCRIPTION OF THE PREFERRED EMBODIMENTS

Figure 1:
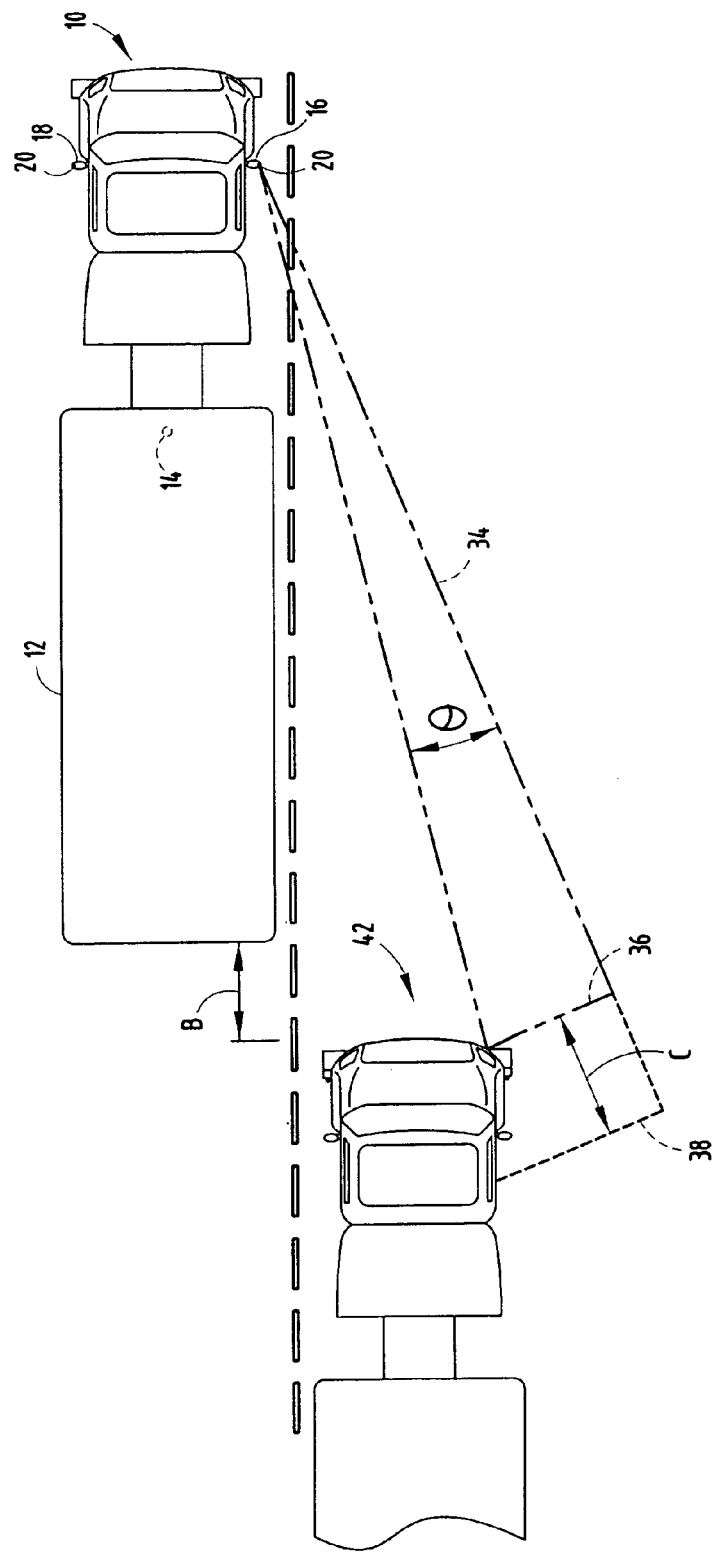
FIG. 1 is a top schematic view of a commercial vehicle (e.g., semi-truck) equipped with a lane change assist system according to the present invention.
Figure 3:
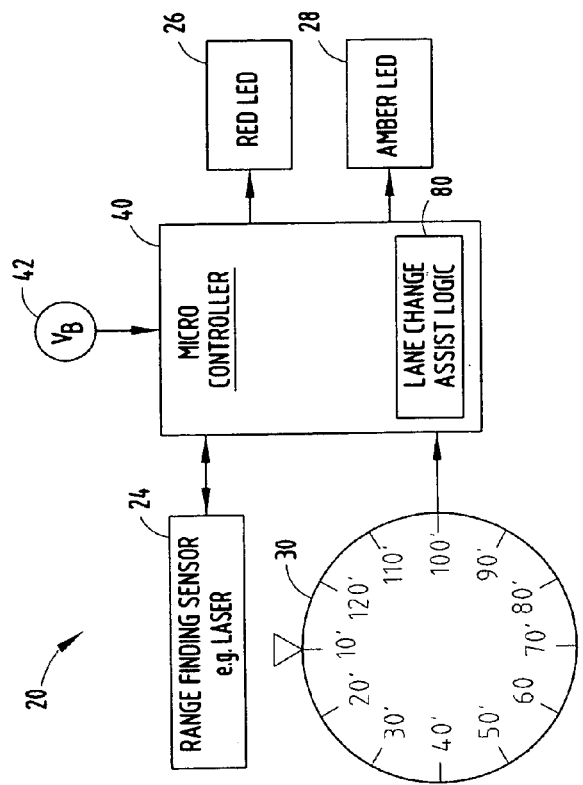
FIG. 3 is a block diagram illustrating the lane change assist system of the present invention.
Figure 2:
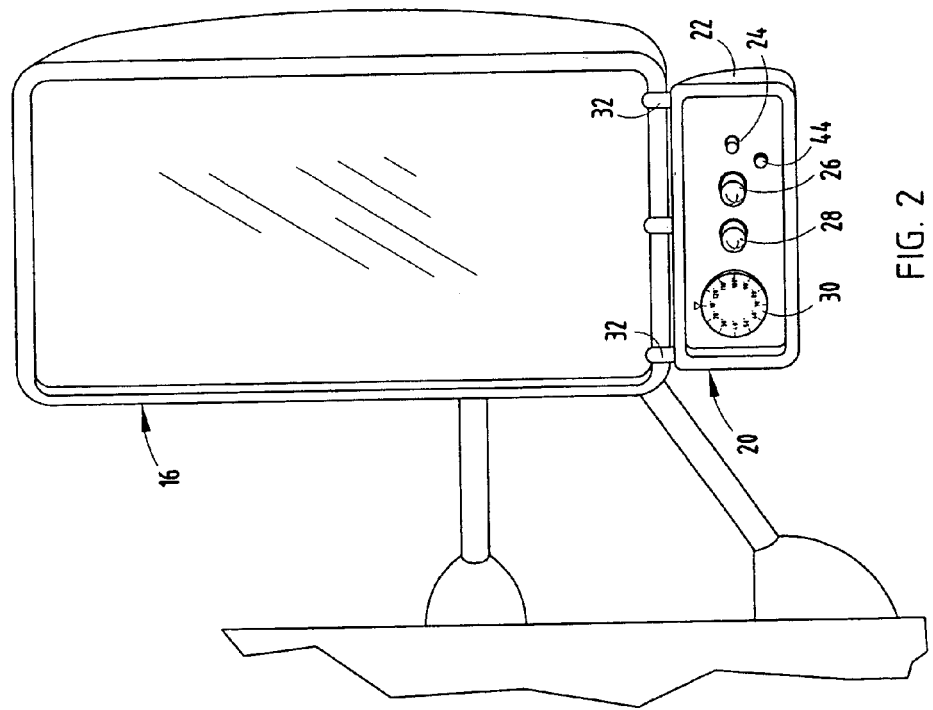
FIG. 2 is an exploded view of the lane change assist system mounted on an exterior rearview mirror of the vehicle.

Referring to FIGS. 1-3, a vehicle lane change assist system 20 is shown employed on the exterior rearview mirror housings of a commercial vehicle 10, according to one embodiment of the present invention. The vehicle 10 may include a commercial vehicle, such as a tractor and trailer semi-truck having a fifth wheel tow hitch 14 adapted to trailer a cargo trailer 12, according to one embodiment. According to other embodiments, the vehicle 10 may include a box truck or recreational vehicle (RV). The lane change assist system 20 may be used onboard other types of vehicles 10 as well as passenger vehicles, according to further embodiments.

The lane change assist system 20 is mounted on the side of the vehicle 10 to detect the presence of one or more objects in a side detection zone 34 in a lane adjacent to the side of the host vehicle 10. The side detection zone 34 is intended to cover the adjacent lane on the roadway. The system 10 also senses range (i.e. distance) to the detected object and determines whether the side detection zone 34 is sufficiently clear of obstacles to initiate a lane change maneuver based on the sensed range to any detected object(s). The system 10 further provides an output indicator for indicating to the driver of the host vehicle 10 whether the side detection zone 34 is sufficiently clear to change lanes.

The lane change assist system 20 is shown in FIGS. 1 and 2 mounted to the exterior side view mirror housings 16 and 18 of the host vehicle 10 according to one embodiment. A first lane change assist system 20 is mounted to the passenger (right) side side view mirror housing 16 for assisting with right lane maneuvers. A second lane change assist system 20 is mounted to the driver (left) side rearview mirror housing 18 for assisting with left lane maneuvers.

Lane change assist system 10 is shown in FIG. 2 mounted via mounting brackets 32 to the lower side housing of side view mirror 16, according to one embodiment. Brackets 32 may include any known fastening mechanism. It should be appreciated that alternative mounting arrangements may be employed to mount lane change assist system 10 to the mirror housing or any other location onboard host vehicle 10 sufficient to detect range to objects in the adjacent lane. According to another embodiment, system 10 could be adhered to the front of a portion of the reflective mirror 16.

The lane change assist system 10 could be original equipment manufacturer (OEM) installed or could be an aftermarket add-on product which is easily transferable from vehicle to vehicle. Generally contained within the system housing 22 is a range finding sensor 24, red and amber light emitting diodes (LEDs) 26 and 28, a range setting threshold control knob 30, and a microcontroller 40. Also included is a mechanical angle fastening input 44 for adjusting the azimuth angle $\theta$ and pitch angle (not shown) of the range finding sensor 24.

The range finding sensor 24 may include a laser, according to one embodiment. The laser sensor 24 should have an illumination intensity (brightness) that does not blind or otherwise harm or adversely affect drivers of other vehicles. One example of a suitable laser range finder is Impulse 100, commercially available from Laser Technology. However, it should be appreciated that other types of range finding sensors may be employed, according to other embodiments. The range finding sensor 24 should have a sufficiently wide azimuth angle of view $\theta$ and range of coverage. In one embodiment, sensor 24 has an angular azimuth $\theta$ of about five to six degrees (5-6°).

Referring to FIG. 3, the microcontroller 40 is shown receiving as inputs the setting from range threshold control knob 30 and the sensed range detected by range finding sensor 24. The range threshold control knob 30 indicia marking range selections from ten to one hundred twenty feet, according to one example. Microcontroller 40 processes the range and threshold information and generates output signals to the pair of warning lights, shown as red LED 26 and amber LED 28. The red warning LED 26 is activated when the adjacent lane is occupied by an object, while the amber warning LED 28 is activated when an object is detected just outside the adjacent lane warn the driver to proceed with caution. The processing may be achieved by processing a lane change assist logic routine 80 which, in one embodiment, may be implemented as executable software.

The microcontroller 40 may be implemented in discrete circuitry employing volatile and non-volatile memory. According to one embodiment, microcontroller 40 may be implemented as a proportional-integral-control (PIC) microcontroller having random access memory (RAM) and erasable programmable read-only memory (EPROM). One example of a microcontroller 40 is Model No. PIC 16C781 commercially available from Microchip Corporation. Other known control circuitry including analog and digital controls may be employed as the controller for processing the range signals and activating the warning lights.

The microcontroller 40 is shown powered by voltage $V_B$ supplied by battery 42. It should be appreciated that the battery voltage $V_B$ can also be supplied to power the range finding sensor 24 and warning indicator LEDs 26 and 28. The battery voltage $V_B$ may be supplied by the vehicle battery through an electrical connection in the mirror housing or vehicle door, or may be supplied by separate battery supply.

The lane change assist system 20 can be installed on the host vehicle 10 by a vehicle manufacturer or can be installed on the host vehicle 10 by a consumer or user of the vehicle 10. The system 10 may be easily calibrated to accommodate changes in the adjacent lane side detection zone and/or changes in the length of the host vehicle 10 such as may occur when adding, removing or changing a trailer.

Figure 4:
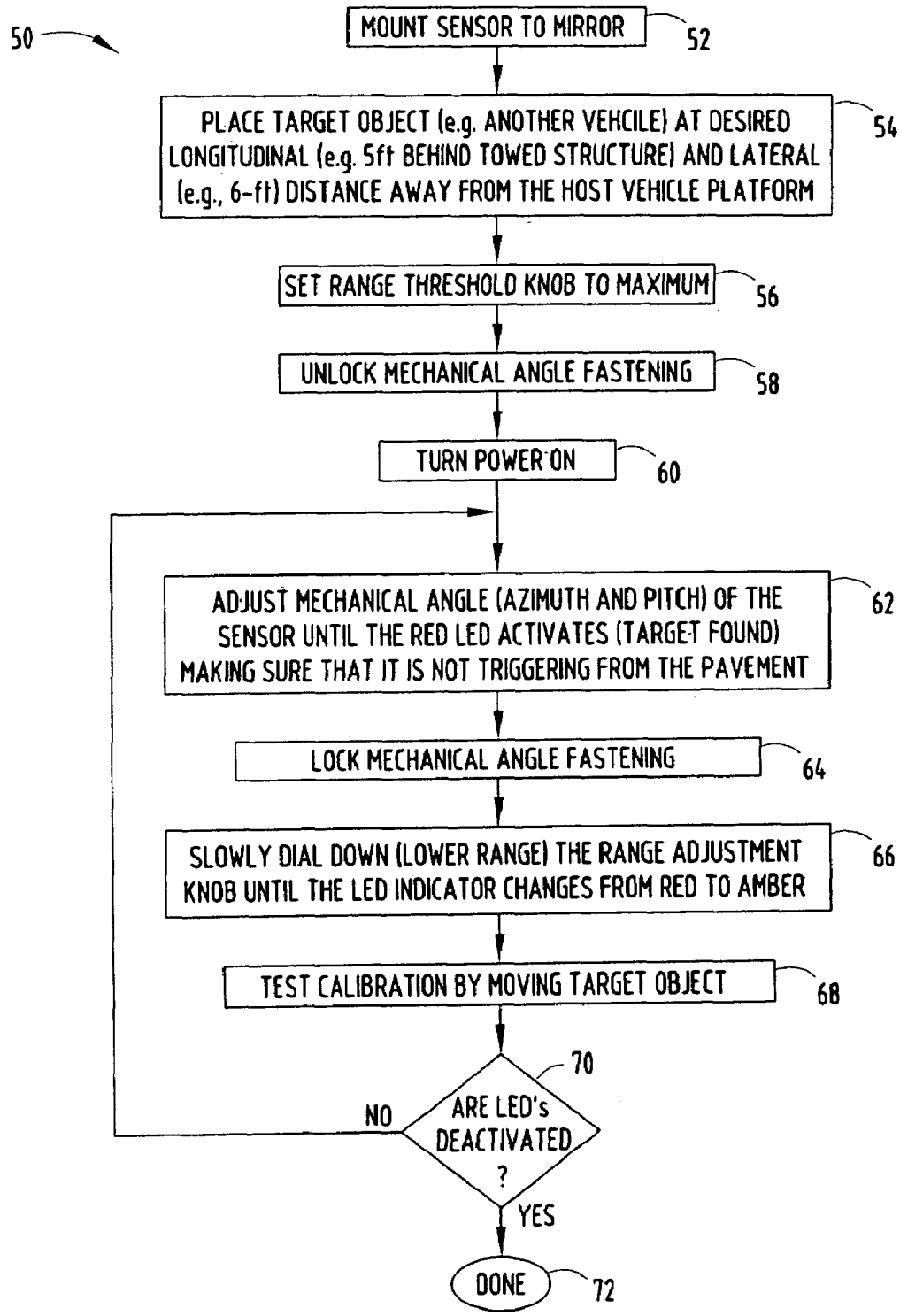
FIG. 4 is a flow diagram illustrating a calibration procedure for calibrating the lane change assist system.

When installed onto a host vehicle 10, the lane change assist system 20 is initially calibrated as shown by calibration procedure 50 in FIG. 4, according to one embodiment. The calibration procedure 50 may be performed by the original vehicle manufacturer or may be performed by a user of the host vehicle 10. With the lane change assist system 10 and its range finding sensor 24 mounted to the mirror housing as required in step 52, calibration routine 50 proceeds to step 54 to place a target object, such as another vehicle 42, at a desired longitudinal distance and lateral distance away from the host vehicle 10. In the truck trailer embodiment, the target object may be located a buffer distance B of about five feet behind the towed trailer structure and about six feet laterally outward in the adjacent lane.

With the target object in place, the range threshold control knob is set to the maximum position in step 56 and the mechanical angle fastening control knob is unlocked in step 58. The power is then turned on in step 60 and the mechanical azimuth angle $\theta$ and pitch angle of the range finding sensor are adjusted until the "lane occupied" red LED is activated in step 62. Activation of the red LED indicates that the obstacle vehicle 42 is detected entering the first and most imminent side detection zone 36 in the adjacent lane, thus setting the point at which the red LED turns on. In doing so, the calibrator should ensure that the range finding sensor is not detecting the roadway (e.g., pavement) as the target object.

Once the mechanical azimuth and pitch angles have been set, the mechanical angle fastening control is locked in step 64. Thereafter, the range threshold control knob is slowly dialed down to decrease the threshold range until the red LED is deactivated and the "proceed with caution" amber LED is activated in step 66. Activation of the amber LED indicates that the obstacle vehicle 42 is entering into the second or extended range 38. The second range 38 is defined as the first range 36 extended by a constant distance C.

Following step 66, calibration routine 50 proceeds to step 68 of testing the calibration settings by moving the test target object. This may include moving the target object to within the first and second coverage zones 36 and 38 and monitoring activation of the corresponding warning lights 26 and 28. Following test step 68, routine 50 proceeds to decision step 70 to determine if the LEDs are deactivated and, if so, the calibration procedure 50 is complete in step 72. Otherwise, if an LED is activated, calibration routine 50 returns back to step 62 to adjust the mechanical angle(s) of the range finding sensor.

It should be appreciated that the calibration routine 50 may be performed when the lane change assist system 20 is first installed onto the host vehicle 10. The calibration routine 50 could also be performed each time a modification is made to the host vehicle 10 that changes the detection range and/or angle $\theta$ of the detection zone 34, such as adding, removing, or replacing a trailer. It should further be appreciated that the system 20 may be easily moved from one vehicle to another vehicle. Upon placing the lane change assist system 20 on a new host vehicle, the calibration procedure 50 easily may be performed by the vehicle operator as previously described.

The lane change assist logic 80 is illustrated in FIG. 5 according to one embodiment. Logic 80 begins at step 82 and proceeds to decision step 84 to determine if the vehicle power/ignition is on. If the vehicle power is not on, logic 80 waits for the vehicle power to be turned on before proceeding. Once the vehicle power is turned on, logic 80 proceeds to decision step 86 to determine if a target object is present in the range finder path. If no target object is present in the range finder path, logic 80 proceeds to deactivate both the amber and red LEDs in step 88, and then returns to decision step 86.

If a target object is detected in the range finder path, logic 80 proceeds to decision step 90 to process the detected range to the target object. If the measured range is less than or equal to the set range threshold, logic 80 activates the lane occupied red LED and flashes the proceed with caution amber LED in step 92. If the measured range is greater than the set range threshold, logic 80 then proceeds to decision step 94 to determine if the measured range is less than or equal to the range threshold plus constant C (e.g., five feet), which defines an extended warning range. If the measured range is less than or equal to the range threshold plus constant C, logic 80 activates the amber LED and deactivates the red LED in step 96.

The amber LED serves as a caution warning indicating that an object is not in the adjacent lane, but there is a detected object close to the adjacent lane such that the driver should proceed cautiously. If the measured range is greater than the range threshold plus constant C, logic 80 deactivates both the amber and red LEDs in step 88. Logic 80 continually monitors for the presence of target object(s) and the range to the target object(s), until the vehicle power/ignition is turned off.

Accordingly, the warning indicator LEDs serve to warn the driver of the host vehicle 10 of the presence of an object in the corresponding adjacent lane. The red LED is activated when an object is detected in the adjacent lane side detection zone 34. When the object is no longer in the adjacent lane side detection zone, but is in an extended zone, the amber LED is activated to serve as a cautionary warning. When no objects are detected in either of the primary detection zone and extended cautionary zone, both LEDs are turned off. As another vehicle approaches the side of the host vehicle 10, the warning indicator activation may change from no LEDs to the amber LED, to the red LED, which the driver may easily monitor to assist in maneuvering lane changes.

In contrast to conventional blind spot detection systems which detect the presence or absence of an object in a blind spot region, the lane change assist system 20 of the present invention quantifies the distance to a detected object that is present in a side detection zone adjacent to the vehicle 10. The detection zone may include a region that is visible in a side view mirror to the driver of the vehicle 10 and, hence, is outside of the blind spot region. While the presence of an object in the side detection zone may be viewable to the driver via a mirror, a determination of whether the object is far enough behind the host vehicle to allow the driver to change lanes is provided by the lane change assist system 20 of the present invention. Thus, the lane change assist system 20 serves as a driver's aid in judging whether the adjacent lane is available for a lane change maneuver.

Accordingly, the lane change assist system 20 of the present invention advantageously provides a warning indicator to the driver of the host vehicle 10 to assist in maneuvering a lane change. The system 20 is cost-effective, easy to install, and easy to use. The system 20 is further easily calibratable by a consumer or user and may be used on any of a number of vehicles.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A system for assisting the driver of a vehicle to maneuver a lane change, said system comprising:
    a range sensor mounted on a vehicle for detecting an object in a side detection zone adjacent to one side of the vehicle and sensing range to the object;
    a controller for determining when the side detection zone is clear for the vehicle to change lanes based on the sensed range, wherein the controller determines whether the side detection zone is sufficiently clear to initiate a lane change maneuver based on the sensed range and generates an output signal indicative thereof; and
    a range threshold control input providing a user selectable range threshold, wherein the controller processes the sensed range and the range threshold and determines whether the side detection zone is sufficiently clear to initiate a lane change maneuver based on the sensed range and range threshold and generates the output signal indicative thereof; and
    an output for outputting the output signal indicative of the determined state for initiating the lane change maneuver.

2. The system as defined in claim 1 further comprising an indicator device for indicating to the driver of the vehicle when a lane change maneuver can be initiated based on the output signal.

3. The system as defined in claim 2, wherein the indicator device comprises:
    a first warning indicator for warning the driver when an object is detected in a first side detection zone; and
    a second warning indicator for warning the driver when an object is detected in a second extended detection zone beyond the side detection zone.

4. The system as defined in claim 3, wherein the first and second warning indicators each comprises at least one LED.

5. The system as defined in claim 1, wherein the range sensor comprises a laser range sensor.

6. The system as defined in claim 1, wherein the range sensor is located on a mirror assembly on the exterior side of the vehicle.

7. The system as defined in claim 1, wherein the range sensor is calibrated to calibrate range and angle of the sensor.

8. The method as defined in claim 1, wherein the side detection zone comprises a region that is viewable in a side view mirror to a driver of the vehicle.

9. The system as defined in claim 1, wherein the range threshold control input comprises a user manipulated knob.

10. The system as defined in claim 1 further comprising an angle threshold control input for providing a user selectable angle threshold for adjusting the angle of the range sensor.

11. The system as defined in claim 1 further comprising a bracket for mounting the system onto the vehicle such that the system may be interchangeably mounted onto one of a plurality of vehicles.

12. A method of assisting a driver of a vehicle in performing a lane change maneuver, said method comprising the steps of:
    sensing presence of an object in a side region of a vehicle;
    detecting range via a sensor to the object detected in said side region of the vehicle;
    comparing the determined range to at least one threshold range;
    adjusting the at least one threshold range based on a user selectable range threshold input;

determining the object is within a side detection zone of the vehicle when the range is less than the at least one threshold range; and generating an output signal indicative of the object being within the near detection zone when the determined range exceeds the threshold range.

13. The method as defined in claim 12, wherein the method further comprises the step of initiating a warning indicator based on the output signal when the determined range is less than a first threshold range.

14. The method as defined in claim 13, wherein the method further comprises the step of initiating a second indicator warning when the determined range exceeds the first greater threshold and is less than a second threshold range.

15. The method as defined in claim 13, wherein the warning indicator comprises a light indicator.

16. The method as defined in claim 12, wherein the step of sensing comprises transmitting a laser beam.

17. The method as defined in claim 12, wherein the method further comprises the step of calibrating the range sensor to calibrate angle and range.

18. The system as defined in claim 12, wherein the side detection zone comprises a region that is viewable in a side view mirror to a driver of the vehicle.

19. The method as defined in claim 12, wherein the step of adjusting the at least one threshold range comprises a user manipulating a threshold range control input.

20. The method as defined in claim 19, wherein the threshold range control input comprises a rotary knob.

21. The method as defined in claim 12 further comprising the step of adjusting an angle of the range detection based on a user selectable angle threshold input.

22. The method as defined in claim 12 further comprising the step of mounting a range sensor to the vehicle with a bracket, such that the range sensor may be interchangeably employed on other vehicles.

* * * * *